(12) United States Patent
Kii et al.

(10) Patent No.: US 9,617,096 B2
(45) Date of Patent: Apr. 11, 2017

(54) TRANSPORT APPARATUS AND IMAGE READING APPARATUS

(71) Applicant: SEIKO EPSON CORPORATION, Tokyo (JP)

(72) Inventors: Soichiro Kii, Shiojiri (JP); Etsuo Tsuji, Matsumoto (JP); Shota Hiramatsu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/046,603

(22) Filed: Feb. 18, 2016

(65) Prior Publication Data

US 2016/0251182 A1   Sep. 1, 2016

(30) Foreign Application Priority Data

Feb. 26, 2015   (JP) .................................. 2015-036293

(51) Int. Cl.
    G06K 15/00   (2006.01)
    B65H 7/00    (2006.01)
    B65H 5/06    (2006.01)
    H04N 1/00    (2006.01)
(52) U.S. Cl.
    CPC .............. B65H 7/00 (2013.01); B65H 5/062 (2013.01); H04N 1/0057 (2013.01); H04N 1/00795 (2013.01); B65H 2513/10 (2013.01); B65H 2801/03 (2013.01)
(58) Field of Classification Search
    CPC ...... B65H 7/00; B65H 5/062; B65H 2513/10; B65H 2801/03; H04N 1/0057; H04N 1/00795; H04N 2201/0094
    See application file for complete search history.

(56) References Cited

U.S. PATENT DOCUMENTS

| | | | | |
|---|---|---|---|---|
| 7,722,026 B2 * | 5/2010 | Hirate | .................... | B65H 5/062 |
| | | | | 271/10.02 |
| 8,840,217 B2 * | 9/2014 | Yamagata | ................ | B65H 7/18 |
| | | | | 347/16 |
| 2010/0237557 A1 * | 9/2010 | Hara | ........................ | B65H 5/26 |
| | | | | 271/225 |
| 2010/0239343 A1 | 9/2010 | Nukumi | | |
| 2013/0342602 A1 | 12/2013 | Yamagata | | |
| 2015/0084264 A1 * | 3/2015 | Hino | ...................... | B65H 85/00 |
| | | | | 271/3.18 |

FOREIGN PATENT DOCUMENTS

| | | |
|---|---|---|
| JP | 2010-215389 A | 9/2010 |
| JP | 2010-217542 A | 9/2010 |
| JP | 2014-005099 A | 1/2014 |

\* cited by examiner

*Primary Examiner* — Marivelisse Santiago Cordero
*Assistant Examiner* — Neil R McLean
(74) *Attorney, Agent, or Firm* — Workman Nydegger (57) ABSTRACT

A transport apparatus includes: a separation roller pair which is operated when power is transmitted from a first motor; a resist roller pair which is operated when power is transmitted from a second motor; an assist roller pair which is disposed between the separation roller pair and the resist roller pair in the transport direction of the document; a first transmission mechanism portion which transmits the power from the first motor to the assist roller pair; a second transmission mechanism portion which transmits the power from the second motor to the assist roller pair; and a control portion which controls operation aspects of each roller pair.

9 Claims, 8 Drawing Sheets

TRANSPORT APPARATUS AND IMAGE READING APPARATUS

BACKGROUND

1. Technical Field

The present invention relates to a transport apparatus which transports a medium, and an image reading apparatus which generates image data by reading an image from the medium transported by the transport apparatus.

2. Related Art

In JP-A-2010-217542, an example of a printing apparatus which performs printing on a transported medium is disclosed. A transport apparatus of the printing apparatus is provided with a pick-up roller, a separation roller pair, a resist roller pair, a feeding roller pair, and a discharge roller pair which are disposed in order from an upstream side to a downstream side in a transport direction of the medium.

In addition, as such a transport apparatus, an apparatus which is provided with a first motor and a second motor as power sources is known. In such an apparatus, the first motor functions as a power source of the pick-up roller and the separation roller pair, and the second motor functions as a power source of the resist roller pair, the feeding roller pair, and the discharge roller pair.

However, in the above-described transport apparatus, when the medium is nipped by the resist roller pair and the feeding roller pair in the middle of being transported, there is a case where driving of the first motor is stopped, even when the medium is still in a state of being nipped by the separation roller pair. In this case, an operation of the separation roller pair is stopped, and the medium is transported to the downstream side in the transport direction by only the power from the second motor. When the driving of the first motor is stopped in this manner, there is a case where back tension increases, a load applied to the resist roller pair rapidly increases, and the transport speed of the medium by the operation of the resist roller pair changes.

In addition, in a case where the rotation of the separation roller pair is stopped in this manner, when a rear end of the medium passes through the separation roller pair, and the medium nipped by the separation roller pair is released, the back tension decreases, and the load applied to the resist roller pair rapidly decreases. Even in this case, there is a case where the transport speed of the medium by the operation of the resist roller pair changes.

In addition, while performing the printing on the medium by a printing portion, if the transport speed of the medium changes, the printing quality deteriorates.

In addition, when specifying the above-described transport apparatus as a transport apparatus of an image reading apparatus, the following problems are generated. In other words, in such an image reading apparatus, while a reading portion reads an image recorded on the medium, there is a case where the transport speed of the medium changes due to the change in the back tension as described above. In this case, distortion is generated in the image read by the reading portion due to the change in the transport speed of the medium, and the accuracy of generated image data deteriorates.

SUMMARY

An advantage of some aspects of the invention is to provide a transport apparatus and an image reading apparatus which can suppress a change in a transport speed of a medium caused by a change in back tension with respect to the medium.

According to an aspect of the invention, there is provided a transport apparatus which transports a medium along a transporting path, the apparatus including: a first roller pair which is operated when power is transmitted from a first motor, and feeds the medium to a downstream side in a transport direction; a second roller pair which is disposed further on the downstream side in the transport direction than the first roller pair, which is operated when power is transmitted from a second motor, and which feeds the medium to the downstream side in the transport direction; a third roller pair which is disposed between the first roller pair and the second roller pair in the transport direction, and feeds the medium toward the second roller pair; a first transmission mechanism portion which transmits the power from the first motor to the third roller pair; a second transmission mechanism portion which transmits the power from the second motor to the third roller pair; and a control portion which controls operation aspects of each roller pair.

In this configuration, it is possible to transmit power from both the first motor and the second motor to the third roller pair which is disposed between the first roller pair and the second roller pair in the transport direction. In other words, it is possible to operate the third roller pair by only the power from the first motor, to operate the third roller pair by only the power from the second motor, and to operate the third roller pair by the power from both the first motor and the second motor. Therefore, even when the driving of the first motor is stopped to stop the operation of the first roller pair under a circumstance that both the first motor and the second motor are driven, it is possible to continue the operation of the third roller pair by the power from the second motor. As a result, even when the operation of the first roller pair is stopped under a circumstance that the medium is transported by the operation of the second roller pair, since the operation of the third roller pair continues, the transport speed of the medium is unlikely to be changed further on the downstream side than the second roller pair in the transport direction of the medium. In addition, even in a case where the medium nipped by the first roller pair which does not operate is released, since the medium is nipped by the third roller pair which operates by the power from the second motor, the transport speed of the medium is unlikely to be changed further on the downstream side than the second roller pair in the transport direction of a document. Therefore, it is possible to suppress the change in the transport speed of the medium caused by the change in the back tension with respect to the medium.

In the transport apparatus, in a case where the medium which is set in a set portion is transported, when the medium is fed toward the third roller pair by the operation of the first roller pair, and the medium is nipped by the third roller pair, the medium may be fed toward the second roller pair by the first roller pair and the third roller pair, and the control portion may shift a state where the power from the first motor and the power from the second motor are transmitted to the third roller pair, to a state where driving of the first motor is stopped and the third roller pair is operated by the power from the second motor, under a circumstance that the first roller pair, the third roller pair, and the second roller pair nip the medium.

In this configuration, under a circumstance that the first roller pair, the third roller pair, and the second roller pair are operated, and each roller pair nips the medium, the driving of the first motor is stopped. In other words, the driving of the first roller pair is stopped. At this time, since the power from the second motor is transmitted to the third roller pair, even when the driving of the first motor is stopped, the operation of the third roller pair continues. Therefore, since it is possible to continue the operation of the third roller pair, even when the driving of the first roller pair is stopped as the driving of the first motor is stopped, it is possible to suppress the change in the transport speed of the medium.

In the transport apparatus, the second motor may be a stepping motor, and the control portion may increase a driving current value with respect to the second motor during a shift period when a state where the power from both the first motor and the second motor is transmitted to the third roller pair, is shifted to a state where the driving of the second motor continues while the driving of the first motor is stopped.

When the state where the driving of the first motor is stopped is shifted from the state where both the first motor and the second motor are driven, there is a concern that the load applied to the second motor increases during the shift period, and changes the rotational speed of the output shaft of the second motor. In order to suppress the change in the rotational speed, it is desirable to set the driving current value with respect to the second motor to be a large value. However, when the driving of the motor continues in a state where the driving current value is large, the temperature of the motor is likely to increase. Here, in this configuration, during the shift period, the driving current value with respect to the second motor which is the stepping motor increases. Accordingly, it is possible to suppress the change in the rotational speed of a rotation shaft of the second motor as the driving of the first motor is stopped, or it is possible to suppress unevenness of the transport speed of the medium. In addition, in this manner, since it is possible to set the driving current value to be a small value during a period other than the shift period, it is possible to suppress an excessive increase in the temperature of the second motor.

In the transport apparatus, in a case of transporting the medium which is set in the set portion, the control portion may drive the second motor before the medium is nipped by the third roller pair.

In this configuration, at the moment when the driving of the first motor is stopped, the second motor is normally driven. Therefore, compared to a case where the driving of the second motor is initiated when the driving of the first motor is stopped, it is possible to suppress the unevenness of the transport speed of the medium caused by the stopping of the driving of the first motor.

In the transport apparatus, the first transmission mechanism portion may include a one-way power transmission portion which is disposed in the power transmission path to the third roller pair from the first motor, and the one-way power transmission portion may be configured to prohibit the power from being transmitted from the third roller pair to the first motor while allowing power to be transmitted from the first motor to the third roller pair.

In this configuration, when the third roller pair is operated by the power from the second motor, it is possible to prevent the occurrence of a phenomenon that the power from the second motor is transmitted to the first motor. Therefore, it is possible to suppress an unnecessary operation of the first roller pair while the driving of the first motor is stopped.

In the transport apparatus, in a case where the first motor is a motor which can rotate in both normal and reverse directions, a rotational direction of an output shaft of the first motor when transporting the medium to the downstream side in the transport direction is considered the normal direction, and a direction opposite to the rotational direction is considered the reverse direction, the one-way power transmission portion may not transmit power from the first motor to the third roller pair when the output shaft of the first motor rotates in the reverse direction, and the power from the first motor is transmitted to the third roller pair when the output shaft of the first motor rotates in the normal direction.

In this configuration, the operation of the third roller pair, such as transporting the medium to the upstream side in the transport direction, does not occur.

In the transport apparatus, in a case where the one-way power transmission portion of the first transmission mechanism portion is considered as a first one-way power transmission portion, the second transmission mechanism portion may include a second one-way power transmission portion which is disposed in the power transmission path to the third roller pair from the second motor, and the second one-way power transmission portion may be configured to prohibit the power from being transmitted from the third roller pair to the second motor while allowing the power to be transmitted from the second motor to the third roller pair.

In this configuration, when the third roller pair is operated by the power from the first motor while the driving of the second motor is stopped, it is possible to prevent the occurrence of a phenomenon that the power from the first motor is transmitted to the second motor side through the third roller pair. Therefore, it is possible to suppress an unnecessary operation of the second roller pair while the driving of the second motor is stopped.

In the transport apparatus, the second transmission mechanism portion may be a mechanism portion for transmitting the power from the second motor to the second roller pair and the third roller pair, and may include a feed clutch which allows power to be transmitted from the second motor to the second roller pair and the third roller pair in an ON state, and prohibits the power from being transmitted in an OFF state, and a brake clutch which allows the operation of the second roller pair in an OFF state, and prohibits the operation of the second roller pair in an ON state, and, when the feed clutch is in the ON state and the brake clutch is in the OFF state, the brake clutch may transmit power from the second motor to the third roller pair.

In this configuration, by controlling the feed clutch and the brake clutch, it is possible to control operation aspects of the second roller pair and the third roller pair in a state where the second motor is driven.

In the transport apparatus, the control portion may perform skew removing processing of decreasing a degree of bias of the medium by setting the brake clutch to be in the ON state after setting the feed clutch to be in the OFF state when both the first motor and the second motor are driven in a case where the medium which is set in the set portion is transported, and may initiate the feeding to the downstream side in the transport direction of the medium by the second roller pair by setting the feed clutch to be in the ON state after setting the brake clutch to be in the OFF state under a circumstance that the medium is bent between the second roller pair and the third roller pair in the transport direction by performing the skew removing processing.

In this configuration, by making the tip end of the medium abut against the second roller pair by the operations of the first roller pair and the third roller pair, it is possible to reduce the degree of bias of the medium. In addition, in the process of performing the skew removing processing, it is possible to bend the medium between the second roller pair and the third roller pair. In addition, by stopping the driving of the first motor in a state where the medium is bent in this manner, it is possible to enhance an effect of suppressing the change in the transport speed of the medium caused by the stopping of the operation of the first roller pair.

According to another aspect of the invention, there is provided an image reading apparatus including: the above-described transport apparatus; and a reading portion which is disposed further on the downstream side in the transport direction than the second roller pair, and reads an image from a medium transported along the transporting path.

In this configuration, since the change in the transport speed of the medium while the reading portion reads the image from the medium is suppressed, it is possible to improve the accuracy of reading the image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment which specifies a transport apparatus and an image reading apparatus will be described with reference to FIGS. 1 to 9F.

Figure 1:
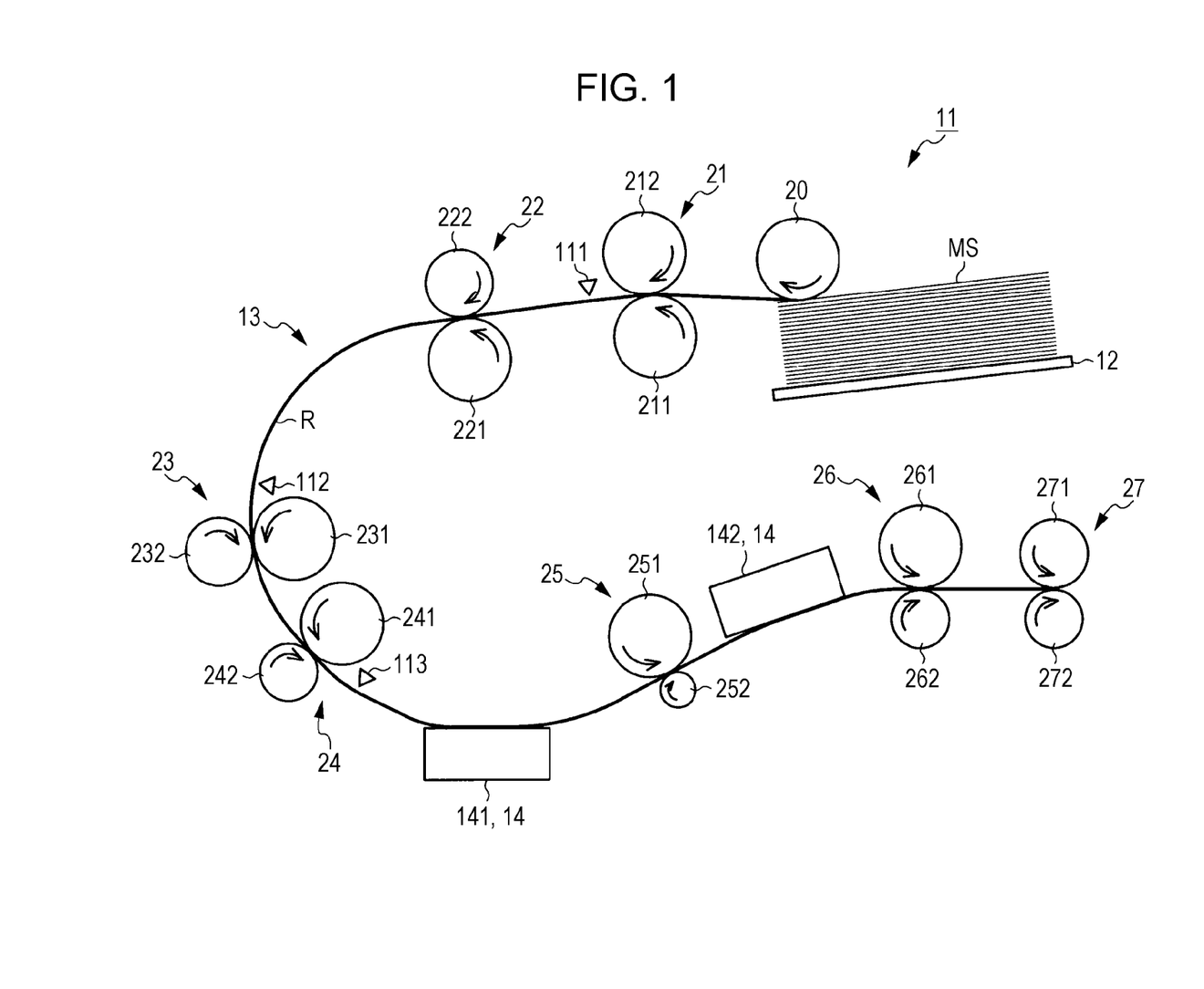
FIG. 1 is a schematic view illustrating an embodiment of an image reading apparatus.

In FIG. 1, an image reading apparatus 11 which configures a multifunction machine which has a function of printing in addition to a function of reading an image is illustrated. As illustrated in FIG. 1, the image reading apparatus 11 of the embodiment includes a set portion 12 in which a document MS which is an example of a medium is set, a transport apparatus 13 which transports the document MS along a predetermined transporting path R from the set portion 12, and a reading apparatus 14 which reads the image from the document MS transported along the transporting path R.

The reading apparatus 14 includes a first reading portion 141 and a second reading portion 142 which are disposed at positions different from each other in the transport direction of the document transported along the transporting path R. An example of the reading portion can include a contact image sensor module (CISM). It is needless to say that another module other than the CISM may also be employed as a reading portion.

The first reading portion 141 is disposed further on the upstream side in the transport direction of the document than the second reading portion 142, and reads the image from a first surface of the document MS. In addition, the second reading portion 142 reads the image from a second surface of the document MS. In addition, in this manner, as information related to the image read by each of the reading portions 141 and 142 input into a control device, image data which is data of the image is generated. In addition, the "second surface" referred to here is a surface which is on a side opposite to the first surface among both surfaces of the document MS.

In the set portion 12, a plurality of documents MS are set in a stacked state.

The transport apparatus 13 includes a pick-up roller 20 which sends out the uppermost document MS set in the set portion 12 to the transporting path R, and a separation roller pair 21 which is disposed further on a downstream side in the transport direction of the document than the pick-up roller 20, and is an example of a first roller pair. The pick-up roller 20 is disposed at a position of being capable of coming into contact with the uppermost document MS of the set portion 12. In addition, the pick-up roller 20 rotates as power from a power source of the transport apparatus 13 is transmitted, and sends out the uppermost document MS.

The separation roller pair 21 includes a driving roller 211 to which the power from the power source of the transport apparatus 13 is transmitted, and a driven roller 212 which is driven to rotate with respect to the rotation of the driving roller 211. In addition, the separation roller pair 21 feeds the document MS toward the downstream side in the transport direction as each of the rollers 211 and 212 rotates in a state of nipping the document MS.

In addition, the driven roller 212 of the separation roller pair 21 is a retard roller to which a constant rotation load is given by a torque limiting mechanism, such as a torque limiter. Therefore, when the plurality of documents MS are sent out from the set portion 12 in an overlapped state, that is, in a case where the plurality of documents MS are double-fed, only one document MS is sent out to the downstream side in the transport direction of the document by the separation roller pair 21.

Further on the downstream side than the separation roller pair 21 in the transport direction of the document, an assist roller pair 22 which is an example of a third roller pair that can nip the document MS fed by the operation of the separation roller pair 21, is provided. The assist roller pair 22 includes a driving roller 221 to which the power from the power source of the transport apparatus 13 is transmitted, and a driven roller 222 which is driven to rotate with respect to the rotation of the driving roller 221. In addition, the assist roller pair 22 feeds the document MS toward the downstream side in the transport direction as each of the rollers 221 and 222 rotates in a state of nipping the document MS.

In addition, further on the downstream side than the assist roller pair 22 in the transport direction of the document, a resist roller pair 23 which is an example of a second roller pair that can nip the document MS fed by the operation of the assist roller pair 22, is provided. The resist roller pair 23 includes a driving roller 231 to which the power from the power source of the transport apparatus 13 is transmitted, and a driven roller 232 which is driven to rotate with respect to the rotation of the driving roller 231. In addition, the resist roller pair 23 feeds the document MS toward the downstream side in the transport direction as each of the rollers 231 and 232 rotates in a state of nipping the document MS. In other words, in the image reading apparatus 11 of the embodiment, the resist roller pair 23 is disposed further on the downstream side in the transport direction of the document than the separation roller pair 21, and the assist roller pair 22 is disposed between the separation roller pair 21 and the resist roller pair 23 in the transport direction of the document.

In addition, further on the downstream side than the resist roller pair 23 in the transport direction of the document, a first feeding roller pair 24 which feeds the document MS fed by the operation of the resist roller pair 23 toward the first reading portion 141, is provided. In addition, between the first reading portion 141 and the second reading portion 142 in the transport direction of the document, a second feeding roller pair 25 which feeds the document MS that passes through a reading region of the image by the first reading portion 141 toward the second reading portion 142, is provided. In addition, further on the downstream side than the second reading portion 142 in the transport direction of the document, a third feeding roller pair 26 is provided. In addition, further on the downstream side than the third feeding roller pair 26 in the transport direction of the document, a discharge roller pair 27 for discharging the document MS to the outside of a housing of the image reading apparatus 11, is provided. In addition, each of the feeding roller pairs 24 to 26 and the discharge roller pair 27 include driving rollers 241, 251, 261, and 271 to which the power from the power source of the transport apparatus 13 is transmitted, and driven rollers 242, 252, 262, and 272 which are driven to rotate with respect to the rotation of the driving rollers 241, 251, 261, and 271.

In addition, in the transporting path R of the document, a plurality of sensors is disposed. For example, an inter-document sensor 111 is provided slightly further on the downstream side than the separation roller pair 21 in the transport direction of the document, and a resist sensor 112 is provided slightly further on the upstream side than the resist roller pair 23 in the transport direction. In addition, a feeding sensor 113 is provided between the first feeding roller pair 24 and the first reading portion 141 in the transport direction of the document. Each of the sensors 111 to 113 outputs an ON signal when the document MS is detected, and outputs an OFF signal when the document MS is not detected.

Figure 2:
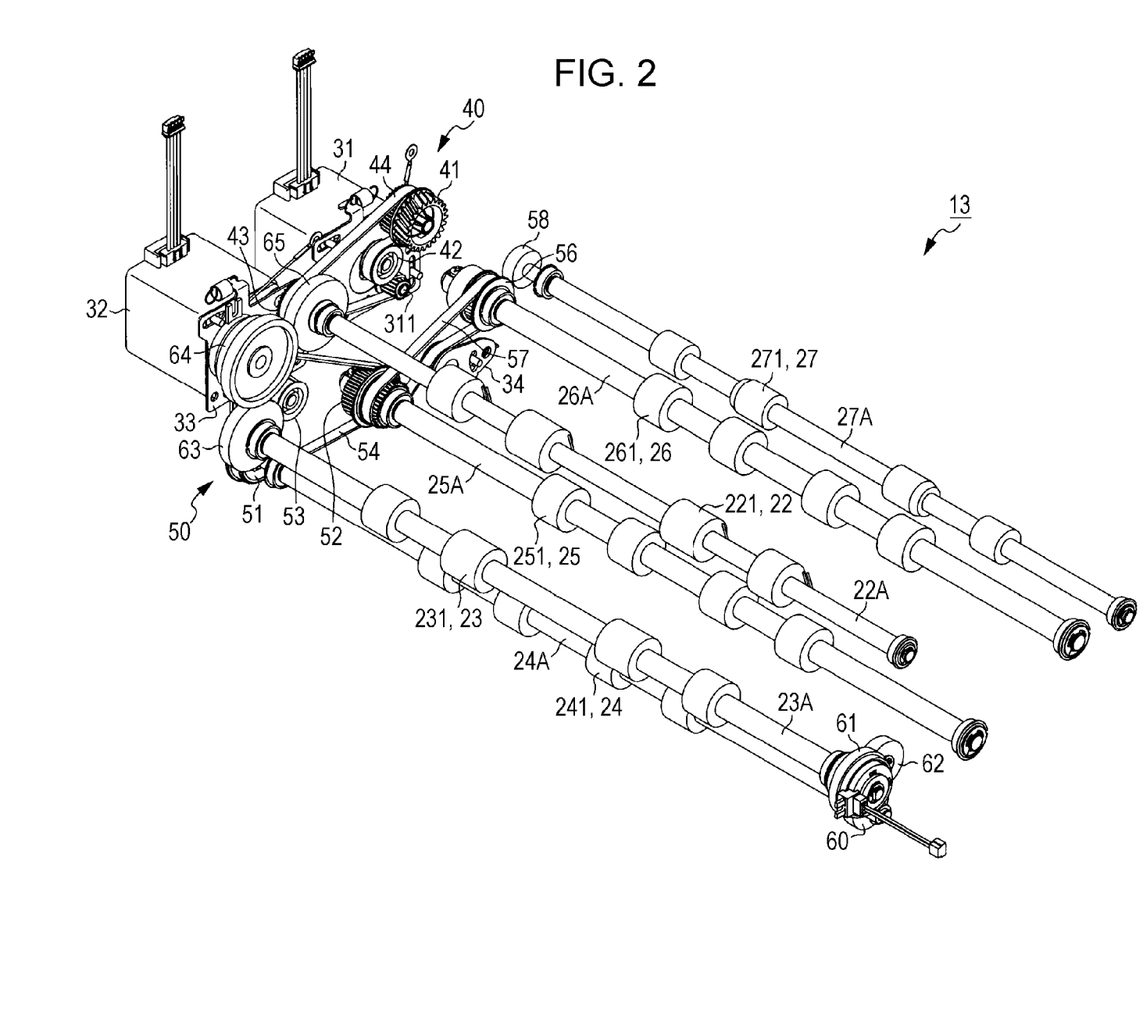
FIG. 2 is a perspective view illustrating a part of a transport apparatus which configures the image reading apparatus.

As illustrated in FIG. 2, the transport apparatus 13 includes a first motor 31 and a second motor 32 which serve as power sources. For example, as the first motor 31 and the second motor 32, it is possible to employ a stepping motor which can rotate in both normal and reverse directions. Each of the motors 31 and 32 are attached to a first supporting board 33 which is fixed to the housing of the image reading apparatus 11.

The power from the first motor 31 is transmitted to the pick-up roller 20 (see FIG. 1), the driving roller 211 of the separation roller pair 21 (see FIG. 1), and the driving roller 221 of the assist roller pair 22.

In addition, the power from the second motor 32 is transmitted to the driving roller 221 of the assist roller pair 22, the driving roller 231 of the resist roller pair 23, the driving rollers 241, 251, and 261 of each of the feeding roller pairs 24 to 26, and the driving roller 271 of the discharge roller pair 27. In other words, in the transport apparatus 13 of the embodiment, it is possible to transmit power from the first motor 31 and the power from the second motor 32, to the driving roller 221 of the assist roller pair 22.

The pick-up roller 20 is supported by a pick-up supporting shaft which is not illustrated, and the driving roller 211 of the separation roller pair 21 is supported by a separation supporting shaft which is not illustrated. In addition, the driving roller 221 of the assist roller pair 22 is supported by an assist supporting shaft 22A, and the driving roller 231 of the resist roller pair 23 is supported by a resist supporting shaft 23A. In addition, the driving roller 241 of the first feeding roller pair 24 is supported by a first feeding supporting shaft 24A, and the driving roller 251 of the second feeding roller pair 25 is supported by a second feeding supporting shaft 25A. In addition, the driving roller 261 of the third feeding roller pair 26 is supported by a third feeding supporting shaft 26A, and the driving roller 271 of the discharge roller pair 27 is supported by a discharge supporting shaft 27A. In addition, each of the rollers rotates integrally with the supporting shafts which support the corresponding rollers. In addition, a direction in which each shaft extends substantially matches a width direction of the document MS transported along the transporting path R.

Next, with reference to FIGS. 3 to 5, a first transmission mechanism portion 40 for transmitting the power from the first motor 31 to the pick-up roller 20, the separation roller pair 21, and the assist roller pair 22 will be described.

Figure 3:
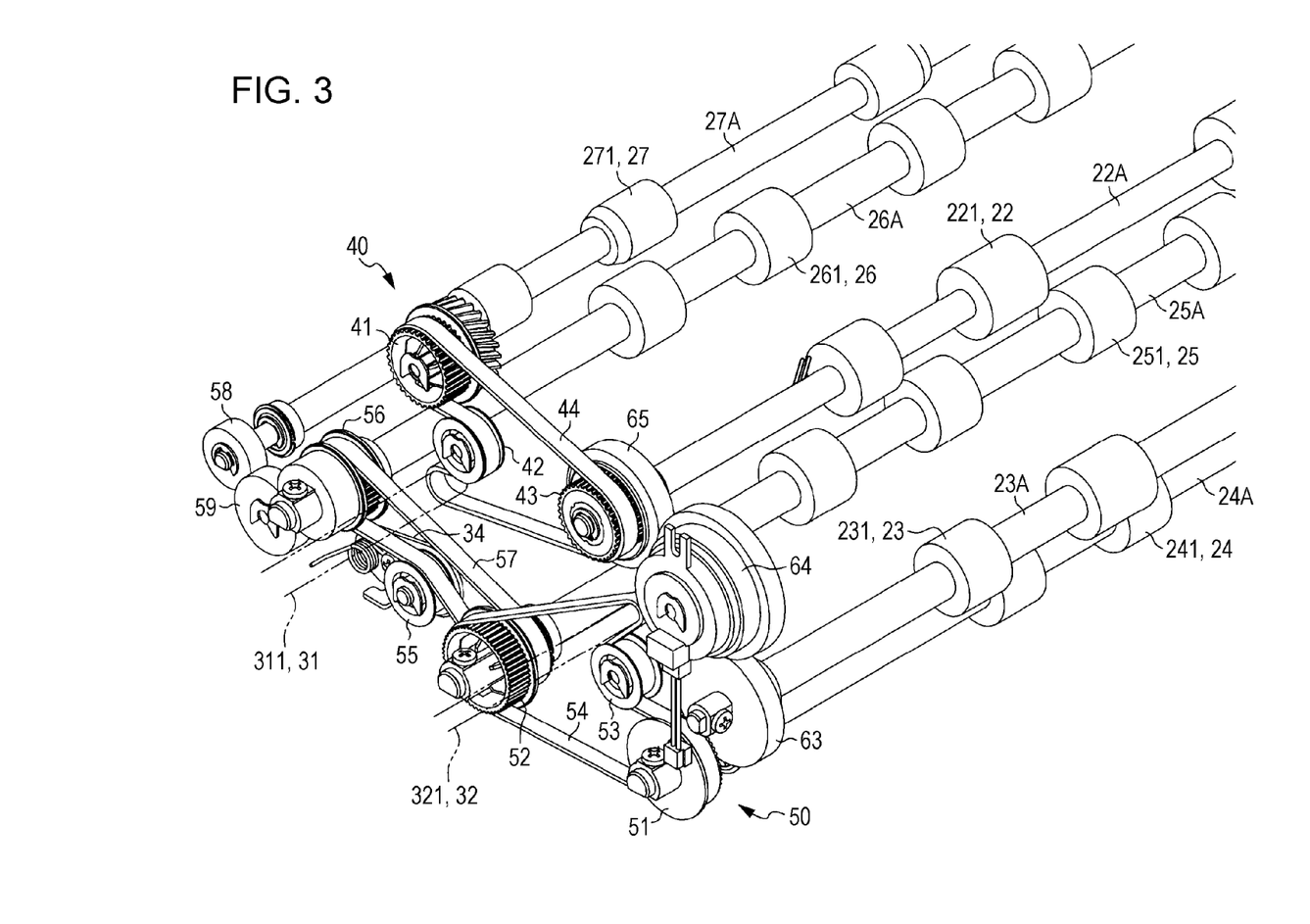
FIG. 3 is a perspective view enlarging and illustrating a part of the transport apparatus.
Figure 4:
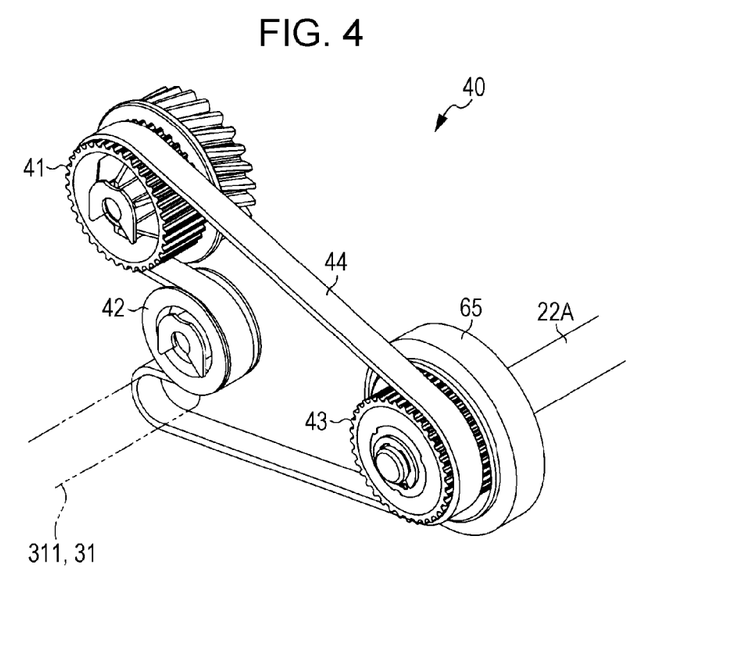
FIG. 4 is a perspective view illustrating a first transmission mechanism portion of the transport apparatus.

As illustrated in FIGS. 3 and 4, the first transmission mechanism portion 40 includes a pick-up gear 41 which is linked to one end in the longitudinal direction of the pick-up supporting shaft, a separation gear 42 which is linked to one end in the longitudinal direction of the separation supporting shaft, and an assist gear 43 which is linked to one end in the longitudinal direction of the assist supporting shaft 22A. In addition, a first transmission belt 44 is laid on the pick-up gear 41, the separation gear 42, and the assist gear 43. The first transmission belt 44 is operated when an output shaft 311 of the first motor 31 is rotated. In addition, when the first transmission belt 44 is operated in this manner, the power from the first motor 31 is transmitted to each of the gears 41 to 43. As a result, each of the gears 41 to 43 rotates in the same direction.

Figure 5:
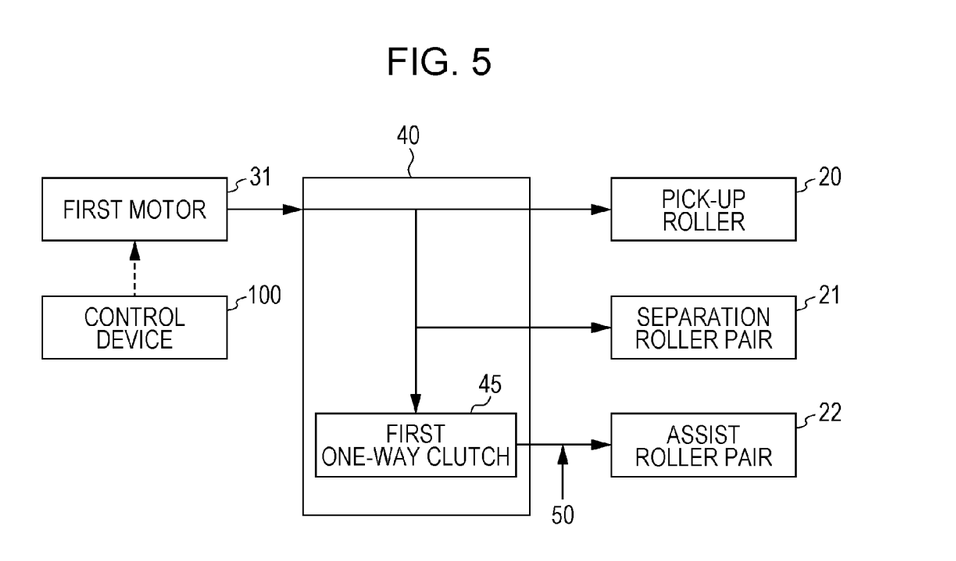
FIG. 5 is a schematic view illustrating the first transmission mechanism portion.

As illustrated in FIGS. 4 and 5, in the first transmission mechanism portion 40, a first one-way clutch 45 which is an example of a first one-way power transmission portion disposed in a power transmission path to the assist roller pair 22 from the first motor 31, is provided. The first one-way clutch 45 is disposed inside the assist gear 43, and the power from the first motor 31 is transmitted through the assist gear 43. In addition, the first one-way clutch 45 is configured to prohibit the power from being transmitted from the assist supporting shaft 22A (that is, the assist roller pair 22) to the first motor 31 while allowing the power to be transmitted from the first motor 31 to the assist supporting shaft 22A (that is, the assist roller pair 22).

In addition, a rotational direction of the output shaft 311 of the first motor 31 for transporting the document MS to the downstream side in the transport direction is considered as a normal direction, and a direction opposite to the rotational direction is considered as a reverse direction. In this case, the first one-way clutch 45 is configured not to transmit power from the first motor 31 to the assist roller pair 22 when the output shaft 311 rotates in the reverse direction while transmitting the power from the first motor 31 to the assist roller pair 22 when the output shaft 311 rotates in the normal direction.

As illustrated in FIG. 5, the driving of the first motor 31 is controlled by a control device 100 of the image reading apparatus 11. In other words, the control device 100 is an example of a control portion. In addition, as the control device 100 which is for initiating the transporting of the document MS set in the set portion 12 drives the first motor 31, the output shaft 311 of the first motor 31 is rotated in the normal direction. Then, the power from the first motor 31 is transmitted to the pick-up roller 20, the separation roller pair 21, and the assist roller pair 22 through the first transmission mechanism portion 40. Accordingly, the uppermost document MS of the set portion 12 is sent out to the transporting path R due to the rotation of the pick-up roller 20, and the document MS is fed along the transporting path R due to the operations of the separation roller pair 21 and the assist roller pair 22.

Next, with reference to FIGS. 2, 3, 6, and 7, a second transmission mechanism portion 50 for transmitting the power from the second motor 32 to the assist roller pair 22, the resist roller pair 23, each of the feeding roller pairs 24 to 26, and the discharge roller pair 27 will be described.

As illustrated in FIGS. 2 and 3, the second transmission mechanism portion 50 includes a first feeding gear 51 which is linked to one end in the longitudinal direction of the first feeding supporting shaft 24A, a second feeding gear 52 which is linked to one end in the longitudinal direction of the second feeding supporting shaft 25A, and a first communication gear 53 which is supported by the first supporting board 33 to freely rotate. In addition, a second transmission belt 54 is laid on the first feeding gear 51, the second feeding gear 52, and the first communication gear 53. The second transmission belt 54 is operated when an output shaft 321 of the second motor 32 is rotated. In addition, when the second transmission belt 54 is operated in this manner, the power from the second motor 32 is transmitted to each of the gears 51 to 53. As a result, each of the gears 51 to 53 rotates in the same direction.

In addition, as illustrated in FIGS. 3 to 6, in the second transmission mechanism portion 50, a second communication gear 55 which is supported by a second supporting board 34 supported by the housing to freely rotate, and a third feeding gear 56 which is linked to one end in the longitudinal direction of the third feeding supporting shaft 26A, are provided. In addition, a third transmission belt 57 is laid on the second feeding gear 52, the second communication gear 55, and the third feeding gear 56. Therefore, when the second feeding gear 52 is rotated due to the rotation of the output shaft 321 of the second motor 32, the third transmission belt 57 is operated. Accordingly, the power from the second motor 32 is transmitted to the third feeding gear 56 through the third transmission belt 57. As a result, the third feeding gear 56 rotates by the power from the second motor 32.

Figure 6:
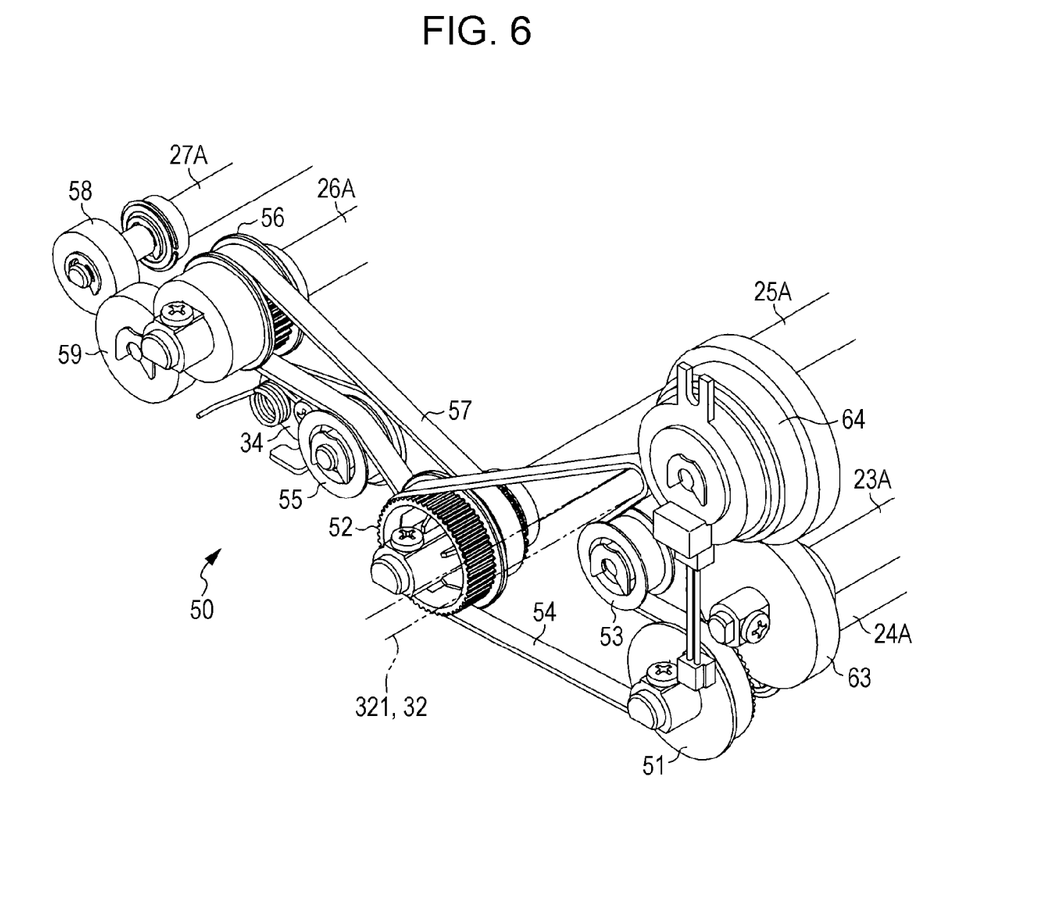
FIG. 6 is a perspective view illustrating a part of a second transmission mechanism portion of the transport apparatus.

In addition, a discharge gear 58 is provided at one end in the longitudinal direction of the discharge supporting shaft 27A. In addition, the rotation of the third feeding gear 56 is transmitted to the discharge gear 58 through a discharge transmission mechanism groove 59. Therefore, when the third feeding gear 56 is rotated by the power from the second motor 32, the discharge gear 58 is also rotated.

In addition, as illustrated in FIGS. 2 and 3, a first transmission gear 60 is provided in an end portion on a side where the first feeding gear 51 is not provided among both ends in the longitudinal direction of the first feeding supporting shaft 24A. In addition, a feed clutch 61 is provided at one end in the longitudinal direction of the resist supporting shaft 23A, and the rotation of the first transmission gear 60 is transmitted to the feed clutch 61 through a second transmission gear 62. In addition, when the feed clutch 61 is in an ON state, the rotation transmitted to the feed clutch 61 through each of the transmission gears 60 and 62 is transmitted to the resist supporting shaft 23A, and the driving roller 231 of the resist roller pair 23 is rotated. Meanwhile, when the feed clutch 61 is in an OFF state, the rotation transmitted to the feed clutch 61 is not transmitted to the first feeding supporting shaft 24A through each of the transmission gears 60 and 62. Therefore, the driving roller 231 of the resist roller pair 23 is not rotated, even when the second motor 32 is driven.

In addition, as illustrated in FIGS. 2 and 6, a third transmission gear 63 is provided in an end portion on a side where the feed clutch 61 is not provided among both ends in the longitudinal direction of the resist supporting shaft 23A. The third transmission gear 63 meshes with a brake clutch 64 provided in the first supporting board 33. When the brake clutch 64 is in an OFF state, the rotation of the resist supporting shaft 23A is allowed. In other words, when the power of the second motor 32 is transmitted to the resist supporting shaft 23A through the feed clutch 61, the driving roller 231 of the resist roller pair 23 is rotated. In other words, the feed clutch 61 can be a clutch which allows power to be transmitted from the second motor 32 to the assist roller pair 22 and the resist roller pair 23 in the ON state, and prohibits the power from being transmitted in the OFF state. Meanwhile, when the brake clutch 64 is in the ON state, the rotation of the resist supporting shaft 23A is prohibited. In other words, the rotation of the driving roller 231 and the driven roller 232 of the resist roller pair 23 is prohibited. Therefore, the brake clutch 64 allows the operation of the resist roller pair 23 in the OFF state, and prohibits the operation of the resist roller pair 23 in the ON state.

Figure 7:
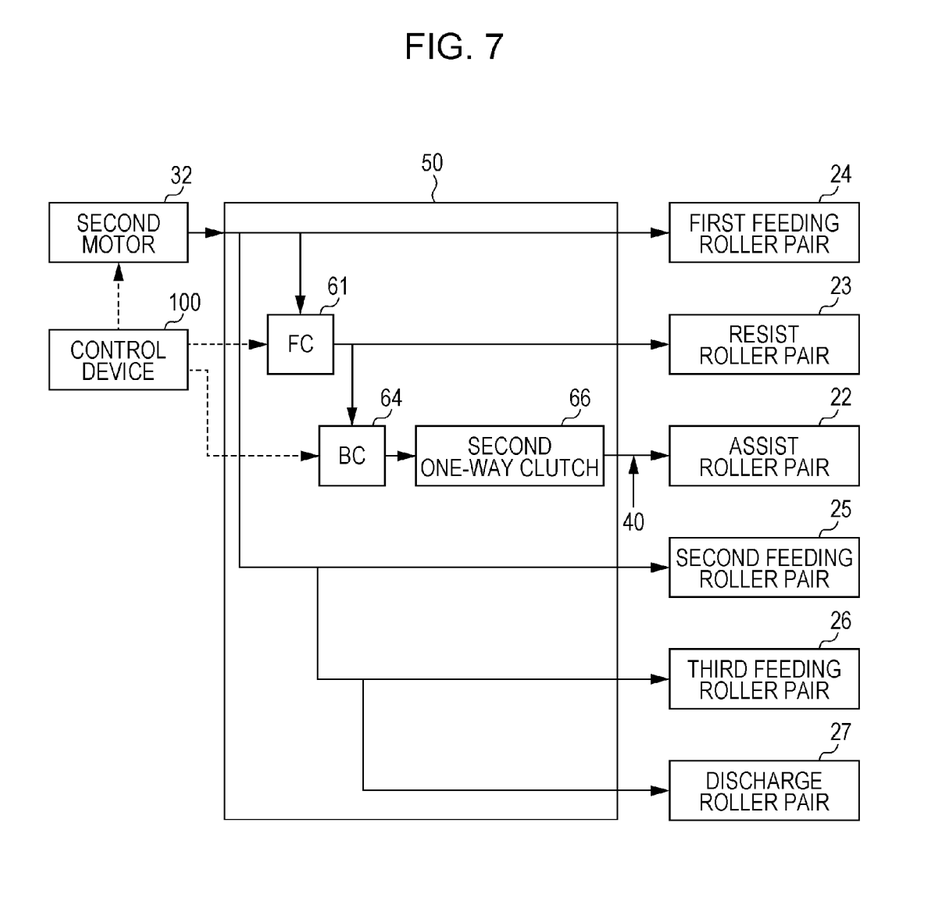
FIG. 7 is a schematic view illustrating the second transmission mechanism portion.

In addition, as illustrated in FIGS. 3 and 7, in the assist supporting shaft 22A, a fourth transmission gear 65 which meshes with the brake clutch 64 is provided. In addition, the fourth transmission gear 65 is connected to the assist supporting shaft 22A through a second one-way clutch 66 which is an example of a second one-way transmission portion. In other words, the second one-way clutch 66 is disposed in the power transmission path which goes from the second motor 32 to the driving roller 221 of the assist roller pair 22. In addition, the second one-way clutch 66 allows power to be transmitted from the second motor 32 to the driving roller 221 of the assist roller pair 22, that is, allows power to be transmitted from the fourth transmission gear 65 to the assist supporting shaft 22A. Meanwhile, the second one-way clutch 66 prohibits the power from being transmitted from the driving roller 221 of the assist roller pair 22 to the second motor 32, that is, prohibits the power from being transmitted from the assist supporting shaft 22A to the fourth transmission gear 65.

As illustrated in FIG. 7, the second motor 32, the feed clutch 61, and the brake clutch 64 are controlled by the control device 100. In other words, when the second motor 32 is driven, the first feeding roller pair 24, the second feeding roller pair 25, the third feeding roller pair 26, and the discharge roller pair 27 are operated at all times. In addition, in a case where the feed clutch 61 is in the ON state and the brake clutch 64 is in the OFF state, when the second motor 32 is driven, the resist roller pair 23 and the assist roller pair 22 are operated. However, in a case where the feed clutch 61 is in the OFF state and the brake clutch 64 is in the ON state, even when the second motor 32 is driven, the operation of the resist roller pair 23 is prohibited.

In addition, in a case where the feed clutch 61 is in the OFF state and the brake clutch 64 is in the ON state, when the first motor 31 is not driven, the assist roller pair 22 is not operated. However, when the first motor 31 is driven, the assist roller pair 22 is operated. In other words, in the transport apparatus 13 of the embodiment, the assist roller pair 22 can be operated based on at least one of the power from the first motor 31 and the power from the second motor 32.

Next, with reference to a flowchart illustrated in FIG. 8, a processing routine performed by the control device 100 when transporting the document MS will be described. The processing routine is initiated by inputting an instruction of reading the image from the document MS to the control device 100.

Figure 8:
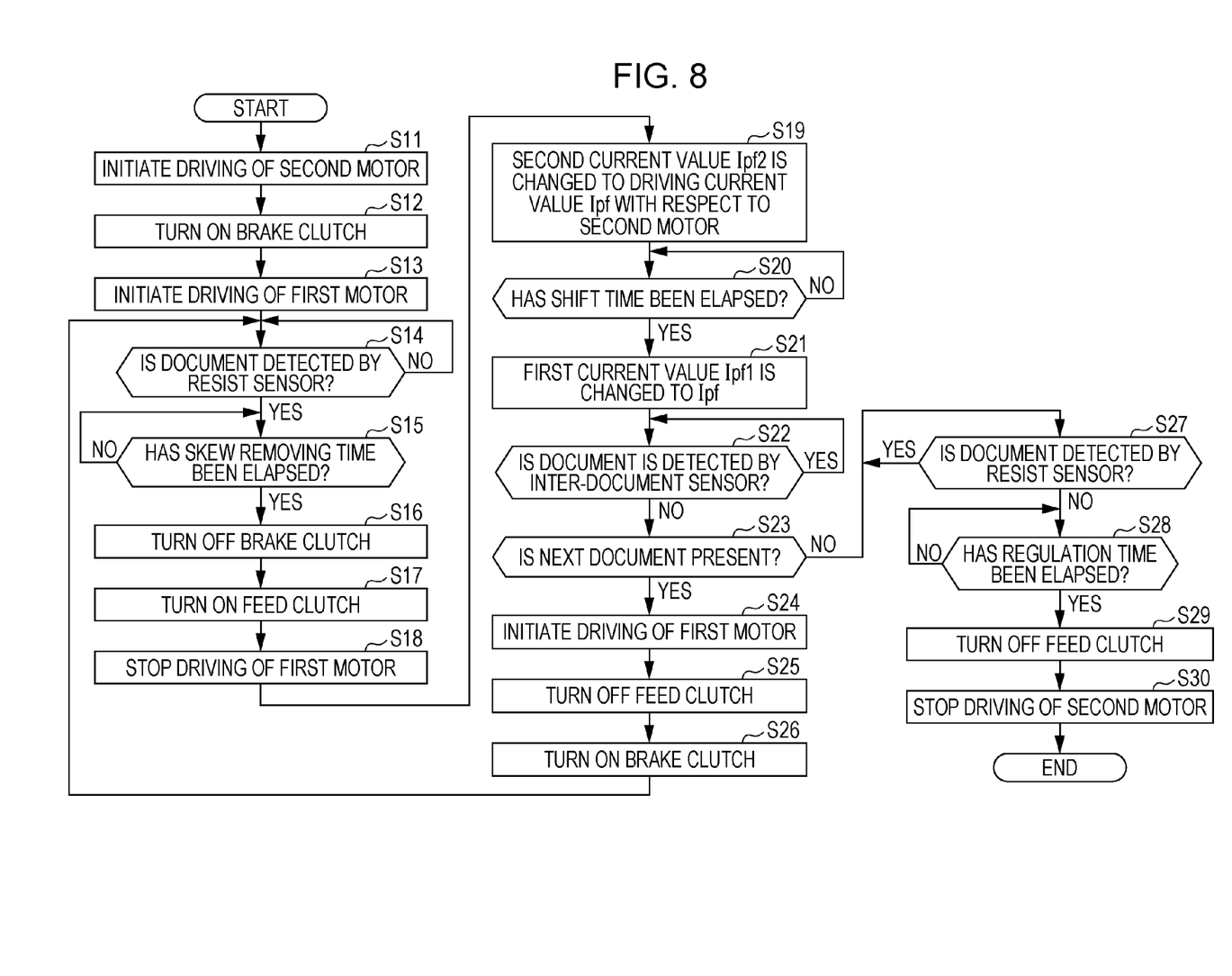
FIG. 8 is a flowchart illustrating a processing routine performed by a control device of the image reading apparatus when transporting a document.
Figure 9A:
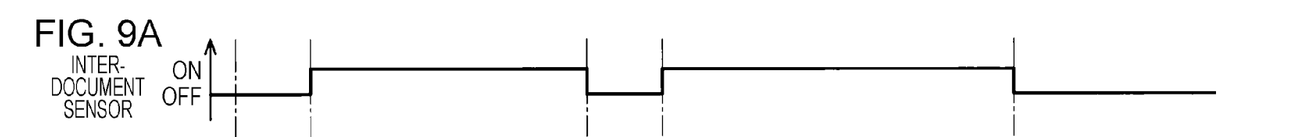
FIGS. 9A to 9F are timing charts when the document is transported.
Figure 9B:
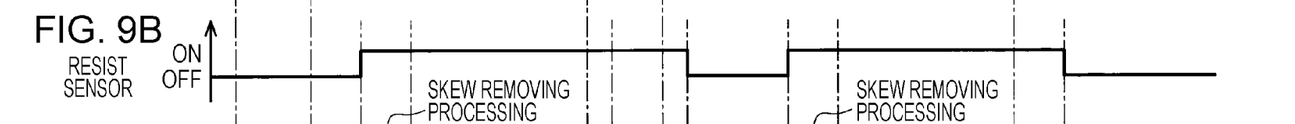
Figure 9C:
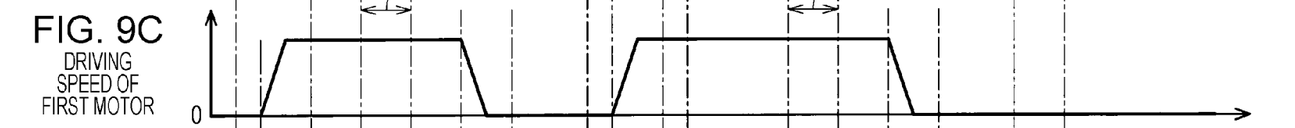
Figure 9D:
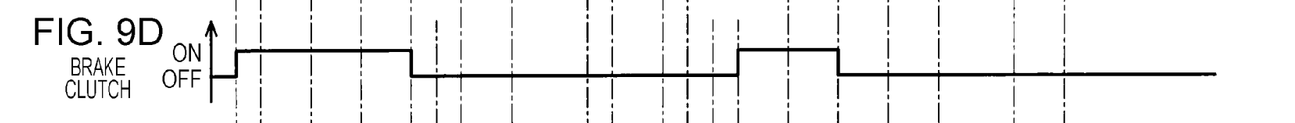
Figure 9E:
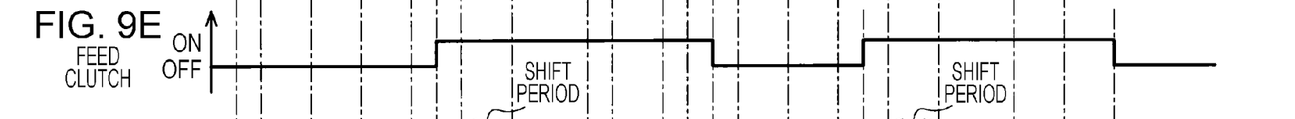
Figure 9F:
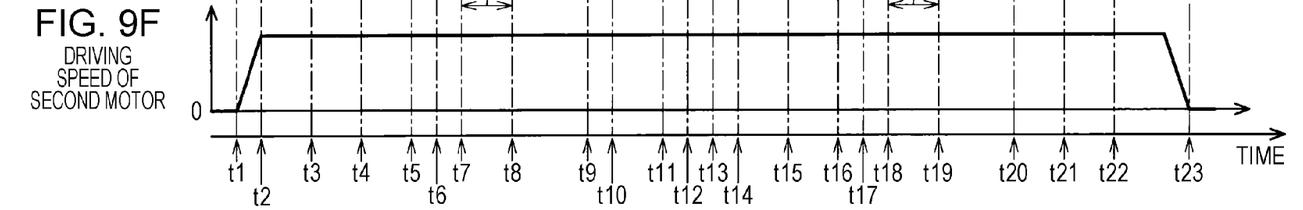

As illustrated in FIG. 8, in the processing routine, the driving of the second motor 32 is initiated (step S11). When initiating the processing routine, the driving of the first motor 31 is stopped and the feed clutch 61 is in the OFF state. Therefore, when the driving of the second motor 32 is initiated, while each of the feeding roller pairs 24 to 26 and the discharge roller pair 27 are operated, the resist roller pair 23 and the assist roller pair 22 are not operated. In addition, when the feed clutch 61 is in the OFF state in this manner, the brake clutch 64 turns OFF (step S12). Accordingly, the operation of the resist roller pair 23 is prohibited.

Next, the driving of the first motor 31 is initiated (step S13). Accordingly, in order to operate the pick-up roller 20, the separation roller pair 21, and the assist roller pair 22, the feeding of the uppermost document MS of the set portion 12 is initiated. In addition, it is determined whether or not the document MS is detected by the resist sensor 112 (step S14). When the document MS is detected by the resist sensor 112, it is possible to determine that the tip end of the fed document MS reaches immediately the front of the resist roller pair 23. Meanwhile, when the document MS has not yet been detected by the resist sensor 112, it is possible to determine that the tip end of the document MS is still separated from the resist roller pair 23.

Therefore, in a case where the document MS has not yet been detected (step S14: NO), the determination processing of step S14 is repeated until the document MS is detected. Meanwhile, in a case where the document MS is detected (step S14: YES), it is determined whether or not the elapsed time from the moment when the document MS is detected by the resist sensor 112 becomes equal to or longer than the skew removing time (step S15). In addition, the processing may be replaced by processing of determining whether or not the number of steps of the second motors 32 from the moment becomes equal to or greater than the number of prescribed steps.

In a case where the document MS is fed by the operations of the separation roller pair 21 and the assist roller pair 22 in this manner, by prohibiting the operation of the resist roller pair 23, it is possible to press the tip end of the document MS against the resist roller pair 23. Accordingly, the degree of bias of the document MS decreases. In other words, when both the first motor 31 and the second motor 32 are driven, by setting the brake clutch 64 to be in the ON state after setting the feed clutch 61 to be in the OFF state, the skew removing processing of decreasing the degree of bias of the document MS is performed. In addition, by performing the skew removing processing in this manner, it is possible to bend the document MS between the assist roller pair 22 and the resist roller pair 23 in the transport direction of the document.

In addition, in a case where the above-described elapsed time is shorter than the skew removing time (step S15: NO), the determination processing of step S15 is repeated. In other words, the skew removing processing continues. Meanwhile, in a case where the above-described elapsed time is equal to or longer than the skew removing time (step S15: YES), the brake clutch 64 turns OFF (step S16). Accordingly, the prohibiting of the operation of the resist roller pair 23 is released, and the skew removing processing is finished. In addition, after the brake clutch 64 turns OFF, the feed clutch 61 turns ON (step S17). Then, not only the power of the first motor 31, but also the power of the second motor 32 is transmitted to the assist roller pair 22. In addition, each of the motors 31 and 32 is driven, and the driving of the first motor 31 is stopped under a circumstance that the separation roller pair 21, the assist roller pair 22, and the resist roller pair 23 nip the document MS (step S18). In other words, under a circumstance that the separation roller pair 21, the assist roller pair 22, and the resist roller pair 23 nip the document MS, the control device 100 shifts from a state where the power from the first motor 31 and the power from the second motor 32 are transmitted to the assist roller pair 22, to a state where the driving of the first motor 31 is stopped and the assist roller pair 22 is operated by the power from the second motor 32.

Here, when the state where both the power from the first motor 31 and the power from the second motor 32 are transmitted to the assist roller pair 22, is shifted to the state where the driving of the second motor 32 continues while the driving of the first motor 31 is stopped, the assist roller pair 22 is operated by only the power from the second motor 32. Therefore, a load applied to the second motor 32 rapidly increases. When the load applied to the second motor 32 rapidly increases in this manner, there is a concern that unevenness is generated in the rotational speed of the output shaft 321, and the transport speed of the document MS changes.

An example of a method for suppressing the occurrence of such a phenomenon includes a method for setting a driving current value Ipf which flows in the second motor 32 to be a relatively large value. Accordingly, even when the load applied to the second motor 32 increases, generation of unevenness of the rotational speed of the output shaft 321 is unlikely. However, in this case, since the driving current value Ipf is large at all times, there is a concern that the temperature of the second motor 32 excessively increases. Here, in the transport apparatus 13 of the embodiment, only in the above-described shift period does the driving current value Ipf increase. Accordingly, since the driving current value Ipf is set to be a small value during the period other than the shift period, the increase in the temperature of the second motor 32 is suppressed.

When the driving of the first motor 31 in step S18 is stopped, the driving current value Ipf with respect to the second motor 32 is set to be a second current value Ipf2 (step S19). In addition, before the shift period, the driving current value Ipf is set to be a first current value Ipf1 which is smaller than the second current value Ipf2.

Next, it is determined whether or not the elapsed time from the moment when the driving current value Ipf is set to be the second current value Ipf2 becomes equal to or longer than the predetermined shift time (step S20). The shift time is set to be a time length which corresponds to the shift period. In addition, the processing may be replaced by processing of determining whether or not the number of steps of the second motors 32 from the moment becomes equal to or greater than the number of the prescribed shift steps.

When the above-described elapsed time is less than the shift time (step S20: NO), the determination processing of step S20 is repeated. Meanwhile, when the above-described elapsed time is equal to or longer than the shift time (step S20: YES), since it is possible to determine that the shift period is finished, the driving current value Ipf with respect to the second motor 32 returns to the first current value Ipf1 (step S21).

Then, the document MS continues to be fed in this state, and the image from the document MS fed in this manner is read by the reading portions 141 and 142. In addition, as the control device 100 obtains information related to the image read by the reading portions 141 and 142 in this manner, image data which is data of the image is generated.

In addition, when the image is read as described above, it is determined whether or not the document MS is detected by the inter-document sensor 111 (step S22). When the document MS has not yet been detected by the inter-document sensor 111 (step S22: YES), since it is possible to determine that the rear end of the document MS, in which the image is read, has not yet passed through an installation position of the inter-document sensor 111, the determination processing of step S22 is repeated.

Meanwhile, when the document MS is not detected by the inter-document sensor 111 (step S22: NO), it is determined whether or not the next document MS in which the image is to be read is present (step S23). When the next document MS is present (step S23: YES), the driving of the first motor 31 is initiated (step S24). Accordingly, the operations of the pick-up roller 20 and the separation roller pair 21 are initiated, and the next document MS is started to be fed from the set portion 12.

In addition, at a timing when the previous document MS cannot be detected by the resist sensor 112, the feed clutch 61 turns OFF (step S25). Accordingly, the power from the second motor 32 is not transmitted to the assist roller pair 22, and the resist roller pair 23 is not operated. In other words, when the document MS nipped by the resist roller pair 23 is released, the operation of the resist roller pair 23 is stopped. In addition, even in this case, since the power from the first motor 31 is transmitted to the assist roller pair 22, the operation of the assist roller pair 22 continues.

In addition, after the feed clutch 61 turns OFF in this manner, the brake clutch 64 turns ON (step S26). Accordingly, since the operation of the resist roller pair 23 is prohibited, it is possible to perform the above-described skew removing processing. Then, the processing is shifted to the above-described step S14.

Meanwhile, in step S23, when the next document MS is not present (NO), it is determined whether or not the document MS in which the image is read is detected by the resist sensor 112 (step S27). When the document MS has already been detected by the resist sensor 112 (step S27: YES), the determination processing of step S27 is repeated until the document MS is not detected. Meanwhile, when the document MS is not detected by the resist sensor 112 (step S27: NO), it is determined whether or not the elapsed time from the moment when the document MS is not detected is equal to or longer than the prescribed time (step S28). The prescribed time is set to be the time until the rear end of the document MS is positioned further on the downstream side in the transport direction than the discharge roller pair 27, or the time which is slightly longer than the time. Therefore, when the above-described elapsed time is equal to or greater than the prescribed time, it is possible to determine that the discharge processing of the document MS has already been completed.

Therefore, when the above-described elapsed time is less than the prescribed time (step S28: NO), since it is possible to determine that the discharge of the document MS has not yet been completed, the determination processing of step S28 is repeated. Meanwhile, when the elapsed time is equal to or longer than the prescribed time (step S28: YES), the feed clutch 61 turns OFF (step S29), and then, the driving of the second motor 32 is stopped (step S30). Then, the processing routine is finished.

Next, with reference to the timing chart illustrated in FIG. 9, the operation when the document MS of which the image is a target to be read is transported will be described.

As illustrated in FIGS. 9A, 9B, 9C, 9D, 9E, and 9F, when an instruction of reading of the image is input to the control device 100, the driving of the second motor 32 is initiated, and the brake clutch 64 turns ON (first timing t1). In addition, the driving current value Ipf with respect to the second motor 32 at this time is set to be first current value Ipf1. In this case, since the feed clutch 61 is set to be OFF, each of the feeding roller pairs 24 to 26 and the discharge roller pair 27 are operated, and the assist roller pair 22 and the resist roller pair 23 are not operated. The operation by the brake clutch 64 is prohibited until reaching the resist roller pair 23.

In addition, at a second timing t2 at which a driving speed of the second motor 32, that is, the rotational speed of the output shaft 321 reaches a normal speed, the driving of the first motor 31 is initiated. In addition, the driving of the first motor 31 may be initiated at a stage where the driving speed of the second motor 32 is accelerated. Then, the operations of the pick-up roller 20, the separation roller pair 21, and the assist roller pair 22 are initiated. At this time, the assist roller pair 22 is operated by only the power from the first motor 31. In addition, the uppermost document MS of the set portion 12 is sent out by the rotation of the pick-up roller 20.

Then, the document MS is nipped by the separation roller pair 21, and the document MS is fed toward the assist roller pair 22 by the operation of the separation roller pair 21. At this time, at a third timing t3, the tip end of the document MS reaches the installation position of the inter-document sensor 111, and the document MS is detected by the inter-document sensor 111. After this, when the document MS is nipped by the assist roller pair 22, the document MS is fed toward the resist roller pair 23 by the operation of the assist roller pair 22.

Then, at a fourth timing t4, the tip end of the document MS reaches an installation position of the resist sensor 112, and the document MS is detected by the resist sensor 112. Immediately after this, the tip end of the document MS comes into contact with the resist roller pair 23. At this time, the operation of the resist roller pair 23 is prohibited by the brake clutch 64. Therefore, the tip end of the document MS fed by the assist roller pair 22 and the separation roller pair 21 is pressed against the resist roller pair 23. In other words, the skew removing processing is performed. While the skew removing processing is performed, since the document MS continues to be fed by the assist roller pair 22 and the separation roller pair 21, the document MS is bent between the assist roller pair 22 and the resist roller pair 23.

At a fifth timing t5 at which the skew removing time has elapsed from the fourth timing t4, the brake clutch 64 turns OFF. In other words, at the fifth timing t5, the skew removing processing is finished. In addition, at a sixth timing t6 after releasing the prohibiting of the operation of the resist roller pair 23 in this manner, the feed clutch 61 turns ON. Then, both the power from the first motor 31 and the power from the second motor 32 are transmitted to the assist roller pair 22. Even when the power from the second motor 32 is transmitted to the assist roller pair 22 in this manner, an operation aspect of the assist roller pair 22 does not change. In other words, the rotational speed of the two rollers 221 and 222 which configure the assist roller pair 22 does not change.

In addition, at a seventh timing t7 at which the document MS is nipped by the separation roller pair 21, the assist roller pair 22, and the resist roller pair 23, the driving of the first motor 31 is stopped. At this time, in accordance with the stopping of the driving of the first motor 31, the driving current value Ipf with respect to the second motor 32 is changed from the first current value Ipf1 to the second current value Ipf2. Therefore, the unevenness of the driving speed of the second motor 32 is suppressed in the above-described shift period, and it is possible to suppress the change in the transport speed of the document MS.

At an eighth timing t8 at which the shift time has elapsed from the seventh timing t7, the driving current value Ipf with respect to the second motor 32 returns to the first current value Ipf1. Then, the image recorded on the document MS transported in this manner is read by the reading portions 141 and 142.

In addition, when the driving of the first motor 31 is stopped in this manner, the operation of the separation roller pair 21 is stopped. Accordingly, back tension with respect to the document MS increases. However, in the transport apparatus 13 of the embodiment, even when the driving of the first motor 31 is stopped, the operation of the assist roller pair 22, which is disposed between the separation roller pair 21 and the resist roller pair 23, continues. Therefore, a significant part of the load which is caused by an increase in the back tension is absorbed by the assist roller pair 22. However, the document MS is bent between the assist roller pair 22 and the resist roller pair 23. Therefore, it is also possible to absorb the load which is caused by the increase in the back tension by the bending of the document MS. Therefore, even when the operation of the separation roller pair 21 is stopped, the load applied to the resist roller pair 23, each of the feeding roller pairs 24 to 26, and the discharge roller pair 27 hardly increases. As a result, further on the downstream side in the transport direction than the resist roller pair 23, since the change in the transport speed of the document MS is suppressed, the deterioration of the accuracy of reading the image by the reading portions 141 and 142 is suppressed.

In addition, when the rear end of the document MS, in which the image is read, passes through the installation position of the inter-document sensor 111, the document MS is not detected by the inter-document sensor 111 (ninth timing t9). Then, at a tenth timing t10 after the ninth timing t9, in order to initiate the transporting of the next document MS, the driving of the first motor 31 is initiated. At the tenth timing t10, since the previous document MS has already been detected by the resist sensor 112, the ON state of the feed clutch 61 continues.

Then, at an eleventh timing t11, the next document MS is detected by the inter-document sensor 111. In addition, at a twelfth timing t12 after this, the previous document MS is not detected by the resist sensor 112.

In addition, during the period from the eleventh timing t11 to the twelfth timing t12, the rear end of the document MS passes through the separation roller pair 21, and the document MS nipped by the separation roller pair 21 is released. However, in the transport apparatus 13 of the embodiment, the assist roller pair 22 which is disposed between the separation roller pair 21 and the resist sensor 112 is operated. Therefore, the document MS nipped by the stopped separation roller pair 21 is released, and even when the back tension with respect to the document MS decreases, it is possible to reduce the influence caused by the deterioration of the back tension to a certain extent by the assist roller pair 22. Therefore, since the rotational speed of each of the rollers 231 and 232 of the resist roller pair 23 hardly changes, the transport speed of the document MS which is further on the downstream side in the transport direction than the resist roller pair 23 hardly changes. Therefore, since the change in the transport speed of the document MS of which the image is being read is suppressed, the deterioration of the accuracy of reading the image by the reading portions 141 and 142 is suppressed.

The feed clutch 61 turns OFF at a thirteenth timing t13 after this, and the brake clutch 64 turns ON at a fourteenth timing t14 after this. Therefore, during the period from a fifteenth timing t15 to a sixteenth timing t16 when the next document MS is detected by the resist sensor 112, the skew processing is performed. In addition, the brake clutch 64 turns OFF at the sixteenth timing t16, and the prohibiting of the operation of the resist roller pair 23 is discontinued. At a seventeenth timing t17 after this, the feed clutch 61 turns ON. Then, both the power from the first motor 31 and the power from the second motor 32 are transmitted to the assist roller pair 22. In addition, at an eighteenth timing t18 when the document MS is nipped by the separation roller pair 21, the assist roller pair 22, and the resist roller pair 23, the driving of the first motor 31 is stopped. At this time, in accordance with the stopping of the driving of the first motor 31, the driving current value Ipf with respect to the second motor 32 is changed to the second current value Ipf2 from the first current value Ipf1.

At a nineteenth timing t19 at which the shift time has elapsed from the eighteenth timing t18, the driving current value Ipf with respect to the second motor 32 returns to the first current value Ipf1. In addition, the image recorded on the document MS transported in this manner is read by the reading portions 141 and 142.

After this, the next document MS is not detected by the inter-document sensor 111 at a twentieth timing t20, the next document MS is not detected by the resist sensor 112 at a twenty-first timing t21 after this. In addition, at a twenty-second timing t22 at which the prescribed time has elapsed from the twenty-first timing t21, since the discharge of the next document MS is completed, the feed clutch 61 turns OFF. In addition, at a twenty-third timing t23 after this, the driving of the second motor 32 is stopped.

Above, according to the image reading apparatus 11 of the embodiment, the following effects can be achieved.

(1) In the transport apparatus 13 of the image reading apparatus 11 of the embodiment, it is possible to operate the assist roller pair 22 by only the power from the first motor 31, to operate the assist roller pair 22 by only the power from the second motor 32, and to operate the assist roller pair 22 by the power from both the first motor 31 and the second motor 32. Therefore, even when the driving of the first motor 31 is stopped and the operation of the separation roller pair 21 is stopped under a circumstance that both the first motor 31 and the second motor 32 are driven, the operation of the assist roller pair 22 can continue by the power from the second motor 32. As a result, the transport speed of the document MS is unlikely to be changed further on the downstream side than the resist roller pair 23 in the transport direction of the document. In addition, even when the document MS nipped by the separation roller pair 21 is released, since the document MS is nipped by the assist roller pair 22 operated by the power from the second motor 32, the transport speed of the document MS is unlikely to be changed further on the downstream side than the resist roller pair 23 in the transport direction of the document. Therefore, it is possible to suppress the change in the transport speed of the document MS caused by the change in the back tension with respect to the document MS.

(2) When the tip end of the document MS which is transported by the operations of the separation roller pair 21 and the assist roller pair 22 reaches the resist roller pair 23, and the document MS is nipped by the resist roller pair 23, the power from both the first motor 31 and the second motor 32 is transmitted to the assist roller pair 22. In addition, even when the driving of the first motor 31 is stopped and the operation of the separation roller pair 21 is stopped in this state, since the power continues to be transmitted from the second motor 32 to the assist roller pair 22, the operation of the assist roller pair 22 can continue. Therefore, it is possible to suppress the change in the transport speed of the document MS in accordance with the stopping of the driving of the first motor 31.

(3) In addition, during the shift period when the state where both the power from the first motor 31 and the power from the second motor 32 are transmitted to the assist roller pair 22, is shifted to the state where the driving of the first motor 31 is stopped and only the power from the second motor 32 is transmitted to the assist roller pair 22, the load applied to the second motor 32 rapidly increases. Here, during this shift period, the driving current value Ipf with respect to the second motor 32 which is a stepping motor increases. Therefore, it is possible to suppress the change in the rotational speed of the output shaft 321 of the second motor 32 in accordance with the stopping of the driving of the first motor 31, and to suppress the unevenness of the transport speed of the document MS.

(4) In addition, during the period other than the shift period, the driving current value Ipf with respect to the second motor 32 becomes smaller than that during the shift period. Therefore, compared to a case where the driving current value Ipf increases during the period other than the shift period, it is possible to suppress the increase in the temperature of the second motor 32.

(5) When transporting the document MS set in the set portion 12, the second motor 32 is driven before the document MS is initially nipped by the resist roller pair 23. Therefore, at the moment when the driving of the first motor 31 is stopped, the second motor 32 is normally driven. Therefore, compared to a case where the driving of the second motor 32 is initiated when the driving of the first motor 31 is stopped, it is possible to suppress the unevenness of the transport speed of the document MS in accordance with the stopping of the driving of the first motor 31.

(6) More specifically, when transporting the document MS set in the set portion 12, the second motor 32 is driven before the driving of the first motor 31 is initiated. Therefore, even if other documents remain on the transporting path R, it is possible to transport the document MS from the set portion 12 while discharging the other documents.

(7) The first one-way clutch 45 is disposed on the power transmission path which is from the first motor 31 to the assist roller pair 22. Due to this, when the assist roller pair 22 is operated by the power from the second motor 32, it is possible to avoid the occurrence of the phenomenon that the power from the second motor 32 is transmitted to the first motor 31 side. Therefore, it is possible to suppress the unnecessary operation of the separation roller pair 21 and the pick-up roller 20 while the driving of the first motor 31 is stopped.

(8) In addition, while transmitting the power from the first motor 31 to the assist roller pair 22 when the output shaft 311 of the first motor 31 rotates in the normal direction, the first one-way clutch 45 does not transmit power from the first motor 31 to the assist roller pair 22 when the output shaft 311 rotates in the reverse direction. Therefore, when the first motor 31 is driven to make the output shaft 311 rotate in the reverse direction, generation of the operation of the assist roller pair 22 to transport the document MS to the upstream side in the transport direction is unlikely.

(9) In addition, on the power transmission path which is from the second motor 32 to the assist roller pair 22, the second one-way clutch 66 is disposed. Due to this, when the assist roller pair 22 is operated by the power from the first motor 31 while the driving of the second motor 32 is stopped, it is possible to prevent the occurrence of the phenomenon that the power from the first motor 31 is transmitted to the second motor 32 side. Therefore, it is possible to suppress the unnecessary operation of the resist roller pair 23 while the driving of the second motor 32 is stopped.

(10) In addition, in the transport apparatus 13 of the embodiment, by controlling the feed clutch 61 and the brake clutch 64, it is possible to control the operation aspects of the assist roller pair 22 and the resist roller pair 23 in as a state where the second motor 32 is driven.

(11) For example, by setting the brake clutch 64 to be in the ON state after setting the feed clutch 61 to be in the OFF state, it is possible to prohibit the operation of the resist roller pair 23. Therefore, as the tip end of the document MS abuts against the resist roller pair 23 in this state due to the operations of the separation roller pair 21 and the assist roller pair 22, it is possible to perform the skew removing processing of reducing the degree of bias of the document MS.

(12) In addition, in the process of performing the skew removing processing, it is possible to bend the document MS between the assist roller pair 22 and the resist roller pair 23. By stopping the driving of the first motor 31 in the state where the document MS is bent in this manner, it is possible to enhance the effect of suppressing the change in the transport speed of the document MS caused by the stopping of the operation of the separation roller pair 21.

(13) In addition, since the transport speed of the document MS does not change in this manner, it is possible to improve the accuracy of reading the image from the transported document.

In addition, the above-described embodiment may be changed as follows.

If the degree of bias of the document MS sent out to the transporting path R from the set portion 12 is within an allowable range, the skew removing processing may not be performed. In this case, before the tip end of the document MS is detected by the resist sensor 112, the resist roller pair 23 may be operated.

In addition, if the period for prohibiting the operation of the resist roller pair 23 is not necessary, the second transmission mechanism portion 50 may not be provided with the brake clutch 64.

In addition, when driving the second motor 32, if the resist roller pair 23 is normally operated, the second transmission mechanism portion 50 may not be provided with the feed clutch 61.

In addition, during the period when the first motor 31 is driven, if the second motor 32 is normally driven, the second transmission mechanism portion 50 may not be provided with the second one-way clutch 66.

The first motor 31 may be a motor other than the stepping motor.

The second motor 32 may be a motor other than the stepping motor.

When initiating the transporting of the document MS from the set portion 12, in a case where it is possible to confirm that other mediums are not present on the transporting path R, the driving of the first motor 31 may be initiated prior to the driving of the second motor 32. However, even in this case, the driving of the second motor 32 may be initiated before the document MS is detected by the resist sensor 112.

When initiating the transporting of the document MS from the set portion 12, in a case where it is possible to confirm that other mediums are not present on the transporting path R, the driving of each of the motors 31 and 32 may be initiated at the same time.

In the above-described embodiment, the transport apparatus 13 is specified as a transport apparatus of an image reading apparatus, but the invention is not limited thereto, and may be specified as a transport apparatus of another apparatus other than the image reading apparatus. For example, the transport apparatus 13 may be specified as a transport apparatus of a printing apparatus which forms an image on a transported medium, such as a paper sheet. In this case, since the change in the transport speed of the medium while the printing is performed on the medium transported by the transport apparatus 13 can be suppressed, it is possible to improve the printing quality.

The entire discovery of Japanese Patent Application No. 2015-036293, filed Feb. 26, 2015 is expressly incorporated by reference herein.

What is claimed is:

1. A transport apparatus which transports a medium along a transporting path, the apparatus comprising:
   a first roller pair which is operated when power is transmitted from a first motor, and feeds the medium to a downstream side in a transport direction;
   a second roller pair which is disposed further on the downstream side in the transport direction than the first roller pair, which is operated when power is transmitted from a second motor, and which feeds the medium to the downstream side in the transport direction;
   a third roller pair which is disposed between the first roller pair and the second roller pair in the transport direction, and feeds the medium toward the second roller pair;
   a first transmission mechanism portion which transmits the power from the first motor to the third roller pair;
   a second transmission mechanism portion which transmits the power from the second motor to the third roller pair; and
   a control portion which controls operation aspects of each roller pair,
   wherein, in a case where the medium which is set in a set portion is transported, when the medium is fed toward the third roller pair by an operation of the first roller pair, and the medium is nipped by the third roller pair, the medium is fed toward the second roller pair by the first roller pair and the third roller pair, and
   wherein the control portion shifts a state where the power from the first motor and the power from the second motor are transmitted to the third roller pair, to a state where driving of the first motor is stopped and the third roller pair is operated by the power from the second motor, under a circumstance that the first roller pair, the third roller pair, and the second roller pair nip the medium.

2. The transport apparatus according to claim 1,
wherein the second motor is a stepping motor, and
wherein the control portion increases a driving current value with respect to the second motor during a shift period when a state where the power from both the first motor and the second motor is transmitted to the third roller pair, is shifted to a state where the driving of the second motor continues while the driving of the first motor is stopped.

3. The transport apparatus according to claim 2,
wherein, in a case of transporting the medium which is set in the set portion, the control portion drives the second motor before the medium is nipped by the third roller pair.

4. The transport apparatus according to claim 3,
wherein the first transmission mechanism portion includes a one-way power transmission portion which is disposed in the power transmission path to the third roller pair from the first motor, and
wherein the one-way power transmission portion is configured to prohibit the power from being transmitted from the third roller pair to the first motor while allowing the power to be transmitted from the first motor to the third roller pair.

5. The transport apparatus according to claim 4,
wherein, in a case where the first motor is a motor which rotates in both normal and reverse directions, a rotational direction of an output shaft of the first motor when transporting the medium to the downstream side in the transport direction is considered the normal direction, and a direction opposite to the rotational direction is considered the reverse direction, the one-way power transmission portion does not transmit power from the first motor to the third roller pair when the output shaft of the first motor rotates in the reverse direction, and the power from the first motor is transmitted to the third roller pair when the output shaft of the first motor rotates in the normal direction.

6. The transport apparatus according to claim 5,
wherein, in a case where the one-way power transmission portion of the first transmission mechanism portion is considered as a first one-way power transmission portion, the second transmission mechanism portion includes a second one-way power transmission portion which is disposed in the power transmission path to the third roller pair from the second motor, and the second one-way power transmission portion is configured to prohibit the power from being transmitted from the third roller pair to the second motor while allowing the power to be transmitted from the second motor to the third roller pair.

7. The transport apparatus according to claim 6,
wherein the second transmission mechanism portion is a mechanism portion for transmitting the power from the second motor to the second roller pair and the third roller pair, and includes a feed clutch which allows power to be transmitted from the second motor to the second roller pair and the third roller pair in an ON state, and prohibits the power from being transmitted in an OFF state, and a brake clutch which allows the operation of the second roller pair in an OFF state, and prohibits the operation of the second roller pair in an ON state, and
wherein, when the feed clutch is in the ON state and the brake clutch is in the OFF state, the brake clutch transmits the power from the second motor to the third roller pair.

8. The transport apparatus according to claim 7,
wherein the control portion performs skew removing processing of decreasing a degree of bias of the medium by setting the brake clutch to be in the ON state after setting the feed clutch to be in the OFF state when both the first motor and the second motor are driven in a case where the medium which is set in the set portion is transported, and initiates the feeding to the downstream side in the transport direction of the medium by the second roller pair by setting the feed clutch to be in the ON state after setting the brake clutch to be in the OFF state under a circumstance that the medium is bent between the second roller pair and the third roller pair in the transport direction by performing the skew removing processing.

9. An image reading apparatus comprising:

the transport apparatus described in claim 1, and a reading portion which is disposed further on the downstream side in the transport direction than the second roller pair, and reads an image from a medium transported along the transporting path.

* * * * *